US006248154B1

(12) United States Patent
Popov

(10) Patent No.: US 6,248,154 B1
(45) Date of Patent: Jun. 19, 2001

(54) OPERATION PROCESS OF A PUMPING-EJECTION APPARATUS AND RELATED APPARATUS

(75) Inventor: Serguei A. Popov, 4615 Post Oak Pl., Suite 140, Houston, TX (US) 77027

(73) Assignees: Evgueni Petroukhine, Limassol (CY); Serguei A. Popov, Budapest (HU)

( * ) Notice: Subject to any disclaimer, the term of this patent is extended or adjusted under 35 U.S.C. 154(b) by 0 days.

(21) Appl. No.: 09/331,939

(22) PCT Filed: Oct. 22, 1998

(86) PCT No.: PCT/IB98/01689

§ 371 Date: Jun. 28, 1999

§ 102(e) Date: Jun. 28, 1999

(87) PCT Pub. No.: WO99/22148

PCT Pub. Date: May 6, 1999

(30) Foreign Application Priority Data

Oct. 29, 1997 (RU) ............................................... 97117775

(51) Int. Cl.[7] ............................... B01D 19/00; F04F 5/54

(52) U.S. Cl. ............................... 95/156; 95/172; 95/177; 96/323; 96/355; 417/151; 417/196

(58) Field of Search ............................ 95/149, 156, 172, 95/177, 228, 241, 266; 96/322, 323, 355; 417/54, 151, 196; 261/115, 118, DIG. 54

(56) References Cited

U.S. PATENT DOCUMENTS 1,449,504 * 3/1923 Ehrhart .
1,579,259 * 4/1926 Suczek .
2,028,340 1/1936 Lewis .
2,379,436 * 7/1945 Hickman et al. .
3,782,074 * 1/1974 Gardenier .
4,087,208 * 5/1978 Uda et al. .
4,252,543 * 2/1981 Giles .
4,440,719 * 4/1984 Howard .
5,087,175 * 2/1992 Raizman et al. .
5,322,222 * 6/1994 Lott .
5,647,221 * 7/1997 Garris, Jr. .
6,050,781 * 4/2000 Al-Ali .

FOREIGN PATENT DOCUMENTS 7-310700 * 11/1995 (JP) .
2016262 7/1994 (RU) .
2050168 12/1995 (RU) .
1092044 11/1960 (SU) .
559098 7/1977 (SU) .
1733714 5/1992 (SU) .

* cited by examiner

*Primary Examiner*—David A. Simmons
*Assistant Examiner*—Fred Prince
(74) *Attorney, Agent, or Firm*—Mark A. Oathout

(57) ABSTRACT

The invention relates to the field of jet technology. A gas-liquid mixture is fed from a jet apparatus into a jet converter where the flow of the gas-liquid mixture first undergoes expansion and thus is transformed into a supersonic gas-liquid flow. This supersonic gas-liquid flow is then decelerated in a shaped flow-through channel section t of the converter. A pressure jump is generated there and partial transformation of kinetic energy of the flow into potential energy of pressure takes place. In order to implement this operational process, the system is furnished with a jet converter, which includes an expansion chamber and a shaped flow-through section, the inlet of the expansion chamber is connected to the jet apparatus outlet, and the outlet of the shaped flow-through section is connected to a separator.

5 Claims, 2 Drawing Sheets

OPERATION PROCESS OF A PUMPING-EJECTION APPARATUS AND RELATED APPARATUS

BACKGROUND OF THE INVENTION

The present invention pertains to the field of jet technology, primarily to pumping-ejection vacuum-producing apparatuses intended for the vacuum rectification of liquid products, for example, fuel oil. The invention can be used for the distillation of an oil stock.

An operational process of a jet apparatus, which includes feeding of an active medium into a vacuum ejector and evacuation of a gaseous medium from a rectifying column, and a jet apparatus for producing a vacuum while distilling oil which has a vacuum rectifying column and a steam ejector producing a reduced pressure in the column, are known (see U.S. Pat. No. 2028340, class 196-77, 1936).

During operation of the apparatus implementing the introduced process, the evacuated vapours of a liquid product mix with the motive steam. As a result, special purification of condensate of the water steam is required before its discharge into a sewerage system. The purification is quite expensive.

The starting point for this invention is an operational process of a pumpingejection system, which includes delivery of a motive liquid medium from a separator to a pump, feeding of the motive liquid under pressure into a nozzle of a liquid-gas jet apparatus by the pump, forming a flow of the motive liquid in the nozzle and further discharge of this flow from the nozzle, evacuation of a gaseous medium by the liquid flow and forming of a gas-liquid mixture in the jet apparatus (see the USSR certificate of authorship, 559098, MPK 6 F 04 F 5/04, 1977). The same certificate of authorship introduces also a device for realization of this operational process, which has a liquid-gas jet apparatus, a separator and a pump. The discharge side of the pump is connected to the active nozzle of jet apparatus, separator is connected to the pump's suction side, the gas inlet of the jet apparatus is connected to a source of evacuated gaseous medium.

These operational processes and related systems provide evacuation of a vapour-gas medium, for example from a rectifying column by a liquid-gas jet apparatus using a liquid as the motive medium. The application of such devices considerably reduces the emission of ecologically harmful substances into the environment.

But these operational processes and related systems do not ensure effective transformation of kinetic energy of a gas-liquid flow into potential energy of pressure, and therefore the gas-liquid flow enters a separator at a high velocity with a rather low degree of compression of the flow's gaseous component. As a result, optimal conditions for effective separation of the gas-liquid flow into the compressed gas and motive liquid medium cannot be achieved in the separator, plus the separator should include additional constructional elements for decelerating the flow and for reducing foaming.

SUMMARY OF THE INVENTION

The objectives of this invention are to improve the operational process and to increase the operating effectiveness of the system implementing this process by providing conditions for more effective use of kinetic energy of a gas-liquid flow resulting in an increased compression of the gaseous component of the flow and in a reduced speed of the flow at the inlet of the system's separator.

This problem is solved as follows: an operational process of a pumping-ejector system, which includes delivery of a motive liquid medium from a separator to a pump, feeding of the motive liquid medium into the nozzle of a liquid-gas jet apparatus by the pump, forming of a flow of the motive liquid in the nozzle and further discharge of this flow from the nozzle, evacuation of a gaseous medium by the liquid jet and forming of a gas-liquid mixture in the jet apparatus, is modified so that the gas-liquid mixture from the jet apparatus is fed into a jet converter, where the gas-liquid flow at first undergoes expansion and thus is converted into a supersonic gas-liquid flow, and then this supersonic gas-liquid flow is decelerated in a shaped flow-through section of the converter. The flow deceleration is accompanied by the occurrence of a pressure jump and the partial transformation of kinetic energy of the gas-liquid flow into potential energy of pressure. The gas-liquid flow from the shaped flow-through section of the converter is fed into the separator, where the flow is separated into compressed gas and motive liquid.

As regards to an apparatus for embodiment of the above-mentioned operational process, the mentioned technical problem is solved as follows: a pumping-ejection system, which has a liquid-gas jet apparatus, a separator and a pump, and wherein the discharge side of the pump is connected to the active nozzle of the jet apparatus, the separator is connected to the pump's suction side and the gas inlet of the jet apparatus is connected to a source of evacuated gaseous medium, is furnished with a jet converter. The jet converter includes an expansion chamber and a shaped flow-through section. An inlet of the converter's expansion chamber is connected to the outlet of the liquid-gas jet apparatus, and an outlet of the shaped flow-through section of the converter is connected to the separator.

The shaped flow-through section of the jet converter can be in the form of a channel shaped first convergent—then divergent or as a cylinder. The surface area of the cross-section of the throat of the shaped flow-through section of the converter represents from about 1.1 to about 200 times that of the surface area of the outlet cross-section of the jet apparatus' mixing chamber or the surface area of the outlet cross-section of the apparatus' diffuser (if the jet apparatus comprises a diffuser). In case the jet apparatus is a multi-nozzle jet apparatus and each of its nozzles has its own mixing chamber or a mixing chamber with a diffuser, the surface area of the outlet cross-section of the mixing chamber or diffuser as mentioned above is to be understood as the total surface area of the outlet cross-sections of all of the mixing chambers or the total surface area of the outlet cross-sections of all of the diffusers.

Research has shown, that the degree of compression of the gaseous component of a gas-liquid mixture formed in a liquid-gas jet apparatus can be considerably increased if one can secure more effective conversion of kinetic energy of the gas-liquid flow into potential energy of pressure. It was discovered that more effective energy transformation is ensured if the system is furnished with a jet converter installed at the outlet of the jet apparatus, and if this converter is able to provide a supersonic mode of the gas-liquid flow with subsequent deceleration of the flow being accompanied by a pressure jump. As known, sound speed in a gas-liquid flow is often much lower, than sound speed in a one-phase liquid or gaseous medium. It was discovered that by matching (comparatively relating) the shape of the flow-through channel after the jet apparatus, and more precisely by matching the shape of the expansion chamber of the jet converter, it is possible to achieve conditions under which a pre-sonic gas-liquid flow is converted into a supersonic flow. Then, by matching the shape of the flow-through section of the converter following the expansion chamber, it is possible to decelerate the supersonic flow and to effect a pressure jump significantly reducing the speed of the gas-liquid flow. It was also discovered, that such a pressure jump can be effected in both a first convergent then divergent and in cylindrical canals. As discussed above, it was discovered that such processes can be effected most effectively in the jet converter if the ratio of the characteristic dimension of the jet apparatus to the characteristic dimension of the jet converter is within an optimal range. This ratio of characteristic dimensions is the ratio of the surface area of the cross-section of the throat of the converter's shaped flow-through section to the surface area of the cross-section of the outlet of the jet apparatus' diffuser. If the jet apparatus doesn't have a diffuser, this ratio is the ratio of the surface area of the cross-section of the throat of the jet converter to the surface area of the cross-section of the outlet of the jet apparatus' mixing chamber. In case the jet apparatus has a multi-nozzle design and each nozzle has its own mixing chamber with or without a diffuser, the surface area of the outlet cross-section of the mixing chamber or diffuser is understood to be the total surface area of the cross-sections of all of the outlets of the mixing chambers or diffusers. It was discovered that the optimal range of such ratio is from 1.1 to 200. As a result, two effects were achieved, which positively affect operation of a pumping-ejection system. First, the degree of compression of a gaseous component of a gas-liquid mixture rises, which allows a consumer to use this compressed gas. This is particularly important, if this gas is a hydrocarbon gas, which, instead of flaring, can be used as a fuel in ovens for crude oil preheating before rectification. The second positive result is a reduction of flow speed at the inlet of the separator. The availability of the jet converter makes the flow speed controllable. As a result, such a flow speed can be fixed, at a speed where separation of the gas-liquid mixture passes most optimally. Additionally, a lower flow speed at the separator's inlet results in a more simple construction of the separator, lower specific consumption of materials of the whole pumping-ejection system and lower hydraulic losses during operation.

So, the introduced pumping-ejection system implementing the described operational process exhibits an improved operational effectiveness.

DETAILED DESCRIPTION

Figure 1:
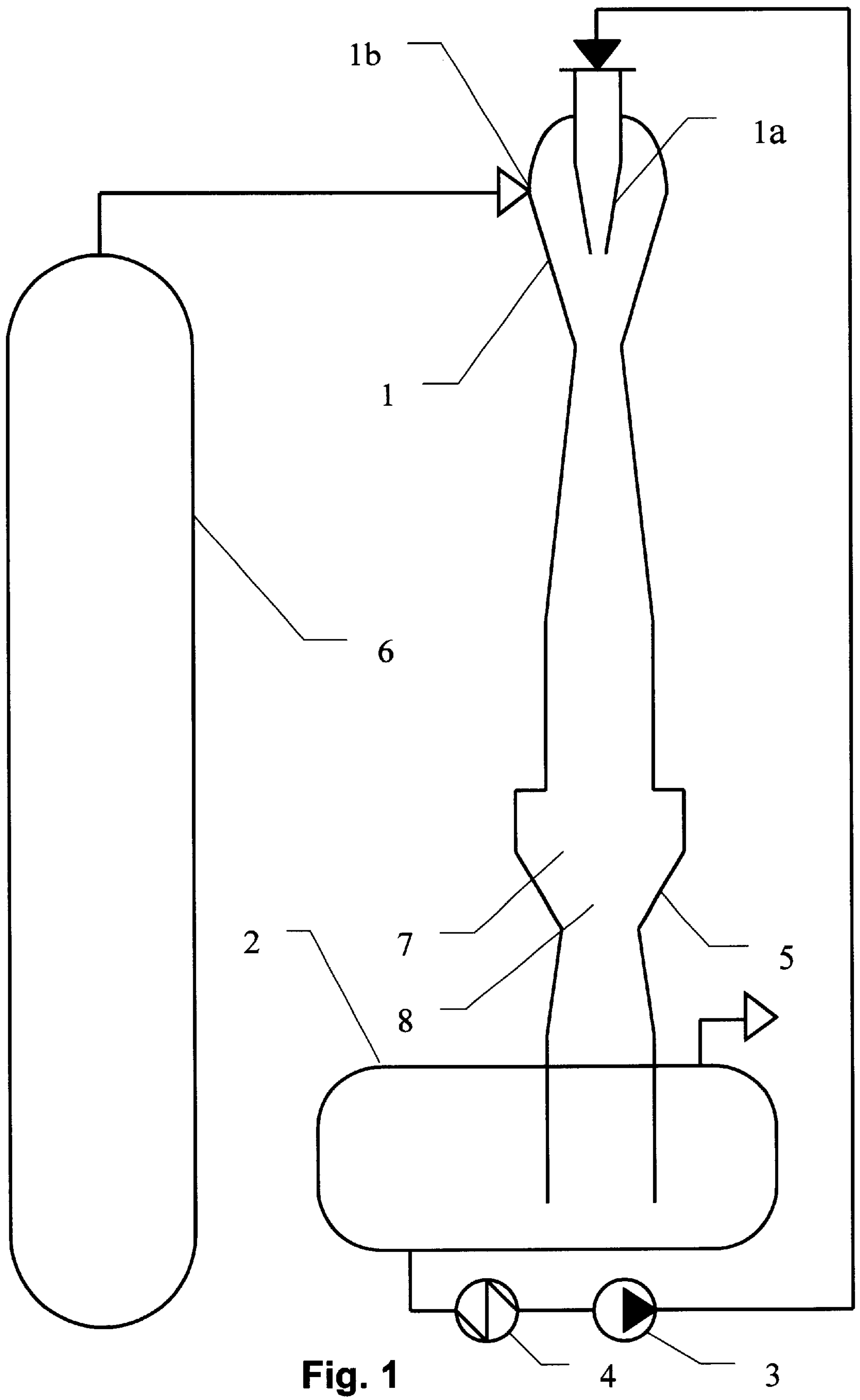
FIG. 1 shows a schematic diagram of a pumping-ejection system with a first convergent. then divergent flow through channel section of a jet converter.
Figure 2:
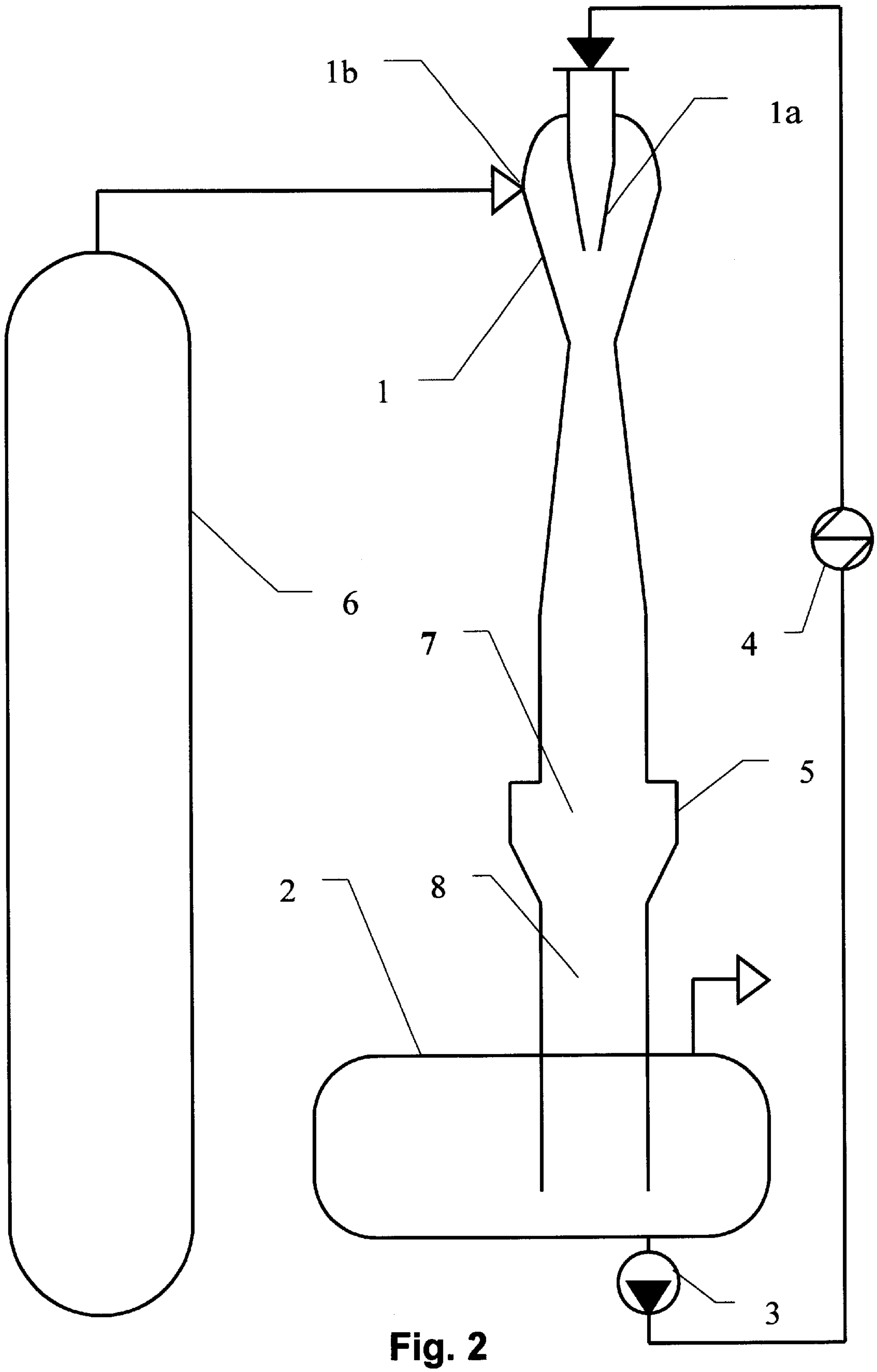
FIG. 2 shows a schematic diagram of a pumping-ejection system with a cylindrical flow-through channel section of a jet converter.

The pumping-ejection system includes a liquid-gas jet apparatus 1, a separator 2, a pump 3, a heat exchanger-chiller 4 and a jet converter 5. The discharge side of the pump 3 is connected to the active nozzle 1*a* of the jet apparatus 1, the separator 2 is connected to the suction side of the pump 3, the gas inlet 1*b* of the jet apparatus 1 is connected to a source 6 of evacuated gaseous medium. The jet converter 5 has an expansion chamber 7 and a shaped flow-through channel section 8 following the expansion chamber 7. An inlet of the expansion chamber 7 of the converter 5 is connected to the outlet of the liquid-gas jet apparatus 1, and an outlet of the shaped flow-through section 8 of the converter 5 is connected to the separator 2. The shaped flow-through channel section 8 can be first convergent then divergent or cylindrical. The surface area of the cross-section of the throat of the shaped section 8 represents from about 1.1 to about 200 times that of the surface area of the outlet cross-section of the diffuser or mixing chamber of jet apparatus 1. The surface area of the outlet cross-section of the mixing chamber or diffuser of the jet apparatus 1 can be understood as the total surface area of the outlet cross-sections of all mixing chambers or diffusers, if the jet apparatus 1 is furnished with several parallel mixing chambers or diffusers.

The operational process of the pumping-ejection apparatus is implemented as follows.

A motive liquid medium from the separator 2 flows into the suction port of the pump 3, the pump 3 delivers it under pressure into the nozzle 1*a* of the liquid-gas jet apparatus 1. The motive liquid medium flowing from the nozzle 1*a* entrains an evacuated gaseous medium, which comes from the source 6 of evacuated medium. The motive liquid mixes with the evacuated gaseous medium in the jet apparatus 1. During mixing the gaseous medium is compressed due to transformation of kinetic energy of the motive liquid into potential energy of pressure. A gas-liquid mixture formed in the jet apparatus 1 flows into the jet converter 5. In the converter 5 the gas-liquid mixture first flows into the expansion chamber 7, where the flow is transformed into a supersonic one. Then this supersonic flow moves into the shaped flow-through channel section 8, where the flow is decelerated and transformed into a subsonic gas-liquid flow in a pressure jump. The pressure of the gaseous component of the flow increases abruptly and the speed of the flow is abruptly reduced in the pressure jump. The gas-liquid mixture from the jet converter 5 then flows into the separator 2, where compressed gas is separated from the motive liquid. Compressed gas is discharged from the separator 2, the motive liquid medium flows from the separator 2 into the suction port of the pump 3. The motive liquid medium becomes warm during operation of the system, which may impair the system's operation. This is why surplus heat of the motive liquid is rejected in the heat exchanger—chiller 4.

Industrial Applicability

This invention can be applied in the chemical, petrochemical and other industries.

What is claimed is:

1. A pumping-ejection operational process, which includes delivering a motive liquid medium from a separator to a pump, feeding the motive liquid medium into a nozzle of a liquid-gas jet apparatus by the pump, forming a flow of the motive liquid medium in the nozzle and discharging the flow from the nozzle, evacuating a gaseous medium by the flow of the motive liquid medium, and forming a gas-liquid mixture in the liquid-gas jet apparatus, comprising the steps of:

feeding the gas-liquid mixture to form a gas-liquid flow from the liquid-gas jet apparatus into a jet converter, including expanding the gas-liquid flow and converting the gas-liquid flow into a supersonic gas-liquid flow;

moving the supersonic gas-liquid flow into a shaped section of the jet converter and decelerating the supersonic gas-liquid flow, including generating a pressure jump, and partially transforming the kinetic energy of the gas-liquid flow into a potential energy of pressure; and feeding the gas-liquid flow from the shaped section of the jet converter into the separator, for separating the gas-liquid flow into a compressed gas and the motive liquid medium.

2. A pumping-ejection system, including a liquid-gas jet apparatus, a separator, and a pump, wherein a discharge side of the pump is connected to an active nozzle of the liquid-gas jet apparatus, the separator is connected to a suction side of the pump, and a gas inlet of the liquid-gas jet apparatus is connected to a source of a gaseous medium, comprising:

a jet converter including an expansion chamber connected to a shaped flow-through section, wherein an inlet of said expansion chamber of said jet converter is connected to an outlet of the liquid-gas jet apparatus and an outlet of said shaped flow-through section of said jet converter is connected to the separator.

3. The system according to claim 2, wherein said shaped flow-through section of said jet converter defines a convergent, then divergent channel.

4. The system according to claim 2, wherein said shaped flow-through section of said jet converter defines a cylindrical channel.

5. The system according to claim 2, wherein the cross-sectional area of a throat of said shaped flow-through section of said jet converter is in a range from about 1.1 to about 200 times the total cross-sectional area of at least one outlet of at least one diffuser of the liquid-gas jet apparatus.

* * * * *